US012749265B2

(12) United States Patent
Mulchandani et al.

(10) Patent No.: US 12,749,265 B2
(45) Date of Patent: Sep. 29, 2026

(54) INVARIANT SPECTRAL MARKERS PROVIDING STEADY REFERENCE AND METHOD FOR USING THE SAME

(71) Applicant: Schlumberger Technology Corporation, Sugar Land, TX (US)

(72) Inventors: Kishore Mulchandani, Menlo Park, CA (US); Ali Rezaei, Houston, TX (US); Bernard Van Haecke, Menlo Park, CA (US); Nasser Ghorbani, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 148 days.

(21) Appl. No.: 18/781,406

(22) Filed: Jul. 23, 2024

(65) Prior Publication Data

US 2026/0030838 A1 Jan. 29, 2026

(51) Int. Cl.
*G06T 17/00* (2006.01)
*G01N 35/00* (2006.01)
(Continued)

(52) U.S. Cl.
CPC ....... *G06T 17/00* (2013.01); *G01N 35/00732* (2013.01); *G01N 35/0099* (2013.01);
(Continued)

(58) Field of Classification Search
CPC . G06T 17/00; G06T 7/73; G06T 2207/10048; G01N 35/00732;
(Continued)

(56) References Cited

U.S. PATENT DOCUMENTS

2011/0295113 A1* 12/2011 Profio .................... A61B 6/032 600/425
2016/0288330 A1* 10/2016 Konolige ............. H04N 13/254
(Continued)

FOREIGN PATENT DOCUMENTS

JP 2021047207 A * 3/2021 ................ G01J 3/28
WO WO-2017168191 A1 * 10/2017 ............... G01V 1/32
WO WO-2024075121 A1 * 4/2024 .............. G01J 3/027

OTHER PUBLICATIONS

Gong, A., Huang, L., Shi, J., & Liu, C. (2022). Unsupervised RGB-T saliency detection by node classification distance and sparse constrained graph learning. Applied Intelligence, 52(1), 1030-1043.
(Continued)

*Primary Examiner* — Tammy Goddard
*Assistant Examiner* — Caiden Alexander Ussery
(74) *Attorney, Agent, or Firm* — Kyle R. Miiller

(57) ABSTRACT

A method for producing multi-dimensional spectral models of a production system. Input data is received from a plurality of spectral markers that are disposed in the production system, the spectral markers providing reference points for multiple readings taken by mobile or stationary sensors to be matched. Each of the spectral markers within the three-dimensional space are read to determine a unique spectral signature corresponding to each one of the spectral markers, the spectral signature having a pattern of spectral values that is unique to each one of the corresponding spectral markers. The determined spectral signatures of each of the plurality of spectral markers are associated with a unique identification which are then provided to a robot within the three-dimensional space. The multi-dimensional spectral model is then reconstructed using the assigned locations. The spectral markers also double as sensors and
(Continued)

can transmit readings along with their unique spectral signatures.

16 Claims, 4 Drawing Sheets

(51) Int. Cl.
*G06K 19/06* (2006.01)
*G06T 7/73* (2017.01)

(52) U.S. Cl.
CPC .......... *G06K 19/06037* (2013.01); *G06T 7/73* (2017.01); *G01N 2035/00752* (2013.01); *G01N 2035/00772* (2013.01); *G06T 2207/10048* (2013.01); *G06T 2207/30204* (2013.01)

(58) Field of Classification Search
CPC ..... G01N 35/0099; G01N 2035/00752; G06K 19/06037
See application file for complete search history.

(56) References Cited

U.S. PATENT DOCUMENTS

| | | | | |
|---|---|---|---|---|
| 2019/0113445 | A1* | 4/2019 | Zhang | G01W 1/02 |
| 2022/0334054 | A1* | 10/2022 | Brogger | B42D 25/387 |

OTHER PUBLICATIONS

Mildenhall, B., Srinivasan, P. P., Tancik, M., Barron, J. T., Ramamoorthi, R., & Ng, R. (2021). Nerf: Representing scenes as neural radiance fields for view synthesis. Communications of the ACM, 65(1), 99-106.

Ma, S., Song, K., Dong, H., Tian, H., & Yan, Y. (2023). Modal complementary fusion network for RGB-T salient object detection. Applied Intelligence, 53(8), 9038-9055.

* cited by examiner

INVARIANT SPECTRAL MARKERS PROVIDING STEADY REFERENCE AND METHOD FOR USING THE SAME

BACKGROUND

Markers are easily and unequivocally distinguishable objects or patterns visible with consistency in a sensed environment. Some sensors, such as thermal infrared (IR) cameras, can operate in different spectral ranges. Spectral markers are markers that are distinguishable in those spectral ranges. For example, thermal imaging involves sensing in the IR spectrum. Thermal markers are invariant patterns in the IR spectrum and are a special case of spectral markers. IR and thermal markers are often used interchangeably as thermal sensing is usually done in the IR spectrum. However, spectral markers may also include objects or patterns that are visible or detectable over a large portion of the spectrum, not just within the range associated with IR.

Some common applications of spectral markers include use within photogrammetry to align a series of cameras, used within 3D scanning to merge successive point clouds, and used within robotics during 3D mapping to create combined LiDAR (Light Detection and Ranging) point clouds.

A thermal marker is a unique and "constant" reference for use in thermal imagery. Thermal imagery shows the temperature of objects; however, the temperature of the object being imaged is not constant and can change. For example, an object that is initially distinguishable in either a visual (RGB) or thermal image can be easily obscured over time as it is hard to have a consistent "sensing" of the environment using only one of these tools.

One of the major problems with thermal markers is that although consistent in one range, they may or may not be unique in other ranges. For example, small white balls and other objects when may be used as visible spectrum markers are often used for photogrammetry. However, when visible spectrum markers are sensed using IR sensors, these markers may appear in different or distinct colors depending on their respective temperatures. Another example is using polka-dots and QR codes on surfaces while scanning so that one can align different images. However, these polka-dots may not appear as dots or may not have the same contrast in the IR spectrum to be distinguished.

Sensing and reconstruction are two elements of the digital world. Sensing relies on transferring data from a device and digitizing it, while reconstruction is a representation of physical objects in a digital domain. To achieve a reliable representation of the physical processes, reliable sensing and reconstruction methods are used. For example, photogrammetry relies on identifying common points shared across multiple images to estimate the respective camera locations and orientations when taking a photo. The local neighborhood of each pixel is examined to find a similar pixel in another photo. A large amount of detail in textures in the photos helps find many more identical points across images and with a high level of confidence. Thermal images, in comparison, tend to have less details than RGB images and a gradient can be seen across different surfaces due to how heat dissipates. Also, in non-steady state processes, the heat signature could vary with time, and hence, the same points in 3D could have a different temperature value if much time elapses between captures either from the exact location or a different location.

With these issues, it can be difficult to get a high-quality thermal rendering in 3D of a facility or production system.

Simply running thermal images through a photogrammetry pipeline or Neural Radiance Fields (NeRF) reconstruction pipeline can produce poor results. When photos are captured in tandem with thermal imaging, one can use photographic reference for aligning thermal images. However, photographic references can be poor due to variable lighting conditions, such as poor or saturated lighting. Further, thermal markers are purposely built equipment with specific patterns and temperature gradients that are hard to miss in thermal images.

What is needed is a system for detecting spectral markers as objects that transfer invariant information to IR cameras or other sensors and can have several applications in the sensing and reconstruction of facilities, production systems, and surface equipment.

SUMMARY

A method is provided for producing three-dimensional spectral models of a production system. The method includes receiving input data from a plurality of spectral markers that are disposed in the production system. The method also includes generating the plurality of spectral markers within a three-dimensional space based upon the input data. The method further includes reading each of the spectral markers within the three-dimensional space to determine a unique spectral signature corresponding to each one of the spectral markers. The method may also include associating the determined spectral signatures of each of the plurality of spectral markers with a unique identification. According to certain embodiments, the unique identification corresponds to a location within the three-dimensional space. The method also includes providing the unique identifications to a robot or a sensor within the three-dimensional space. According to certain embodiments, the robot aligns itself within the three-dimensional space according to the associated locations. The method further includes reconstructing a three-dimensional spectral model including the assigned locations.

A computing system is provided, the computer system including one or more processors, a plurality of spectral markers that are communicated to the one or more processors, a robot communicated to the one or more processors, at least one sensor communicated to the one or more processors, and a memory system comprising one or more non-transitory computer-readable media storing instructions that, when executed by at least one of the one or more processors, cause the computing system to perform operations. According to certain embodiments, the plurality of spectral markers may be disposed within a production system and the robot may be configured to read the plurality of spectral markers. According to certain embodiments, the operations performed by the computing system include receiving input data from the plurality of spectral markers. According to certain embodiments, the input data represents the production system. The performed operations may also include generating the plurality of spectral markers within a three-dimensional space based upon the input data and maintaining at least a portion of each of the spectral markers at an invariant spectral value. According to certain embodiments, the spectral markers receive power to maintain the at least one portion at the invariant spectral value from the three-dimensional space, or from an outside or independent power source. The performed operations may also include reading each of the spectral markers within the three-dimensional space to determine a unique spectral signature that corresponds to each one of the spectral markers.

According to certain embodiments, reading the plurality of spectral markers includes reading the spectral markers with a spectral device that is configured to read a pattern of spectral values of each spectral signature. In certain embodiments, the spectral device may be disposed on the robot. The performed operations may also include associating the determined spectral signatures of each of the plurality of spectral markers with a unique identification. According to certain embodiments, the unique identification corresponds to a location within the three-dimensional space. The performed operations may also include providing the unique identifications to the robot within the three-dimensional space. According to certain embodiments, the robot may align itself within the three-dimensional space according to the associated locations. The performed operations may also include reconstructing a three-dimensional spectral model using the robot or the at least one sensor. According to certain embodiments, the three-dimensional spectral model includes a three-dimensional volume including the assigned locations. The performed operations may also include displaying the reconstructed three-dimensional volume.

A non-transitory computer-readable medium storing instructions is provided that, when executed by one or more processors of a computing system, cause the computing system to perform operations. The performed operations may include receiving input data representing a production system and generating a plurality of spectral markers based upon the input data. According to certain embodiments, the spectral markers may be generated within a three-dimensional space and may include a unique spectral signature. In some embodiments, the unique spectral signature of each of the spectral markers may have a wavelength between 100 nm and 15 mm. In some embodiments each of the spectral markers may include a two-dimensional or three-dimensional shape and a pattern of spectral values that is unique to each one of the corresponding spectral markers. In certain embodiments, each of the spectral markers may have at least one portion that is reflective.

According to certain embodiments, each of the spectral markers may have at least one neutral area, a first area having a spectral value equal to the three-dimensional space, a second area having a spectral value which is higher relative to the first area, and a third area having a spectral value which is lower relative to first area. In certain embodiments, the first, second, and third areas of each of the spectral markers can be arranged in a surface pattern that is unique to each one of the corresponding spectral markers. In certain embodiments, the second area can have a spectral value which is higher relative to a spectral value of the at least one neutral area, while the third area can have a spectral value which is lower relative to the spectral value of the at least one neutral area. According to certain embodiments, the pattern of spectral values that is unique to each one of the corresponding spectral markers may be configured to provide a contrast between at least two areas of the spectral marker. In certain embodiments, the at least one neutral area can be made from a material that is configured to provide a contrast with the first, second, or third areas.

According to certain embodiments, the performed operations can include varying the spectral signature of at least one of the spectral markers over a period of time. In certain embodiments, varying the spectral signature may include cyclically or non-cyclically varying the spectral signature, ceasing a power flow to at least one area of the spectral marker, varying a power intensity of at least one area of the spectral marker, or varying a wave amplitude or a frequency of the spectral marker.

According to certain embodiments, the performed operations may include masking at least a portion of the spectral signature of at least one of the spectral markers with a spectral filter that is disposed on the spectral marker.

The performed operations may also include transmitting a supplemental data signal from at least one of the spectral markers to a user. According to certain embodiments, the supplemental data signal includes at least one of the following: GPS data, humidity, detection or concentration of a gas, pressure, fluid level, temperature, viscosity, velocity, radiation, resistivity, vibration frequency, or combinations thereof.

In certain embodiments, the performed operations may also include maintaining a portion of the spectral markers at a respective invariant spectral value. In some embodiments, the invariant portion of the spectral marker may include the second and third areas. In some embodiments, each of the spectral markers may receive power to maintain the respective invariant spectral value from the three-dimensional space or from an outside or independent power source.

According to certain embodiments, the performed operations may include reading each of the spectral markers within the three-dimensional space to determine the spectral signature corresponding to each one of the spectral markers. In some embodiments, reading the plurality of spectral markers may specifically include reading the spectral markers with a spectral device that is configured to read the pattern of spectral values of each spectral signature. In some embodiments, the spectral device may be disposed on a robot payload or may be a sensor disposed within the production system.

According to certain embodiments, the performed operations may include associating the determined spectral signatures of each of the plurality of spectral markers with a unique identification. In some embodiments, the unique identification may correspond to a location within the three-dimensional space.

According to certain embodiments, the performed operations may include providing the unique identifications to a robot within the three-dimensional space. In some embodiments, the robot may align itself within the three-dimensional space according to the associated locations.

According to certain embodiments, the performed operations may include reconstructing a three-dimensional spectral model using the robot. In some embodiments, the three-dimensional spectral model may include a three-dimensional volume including the assigned locations.

According to certain embodiments, the performed operations may include displaying the reconstructed three-dimensional volume. In some embodiments, displaying the three-dimensional volume includes displaying the reconstructed three-dimensional volume on a screen. In other embodiments, displaying the three-dimensional volume may include detecting an anomaly within the three-dimensional volume by the user.

According to certain embodiments, the performed operations may include performing a wellsite action in response to the three-dimensional spectral model. In some embodiments, performing the wellsite action may include generating or transmitting a signal that instructs or causes an action to occur, the action being a physical action. In some embodiments, the physical action may include selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, or a combination thereof.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

System Overview

Figure 1:
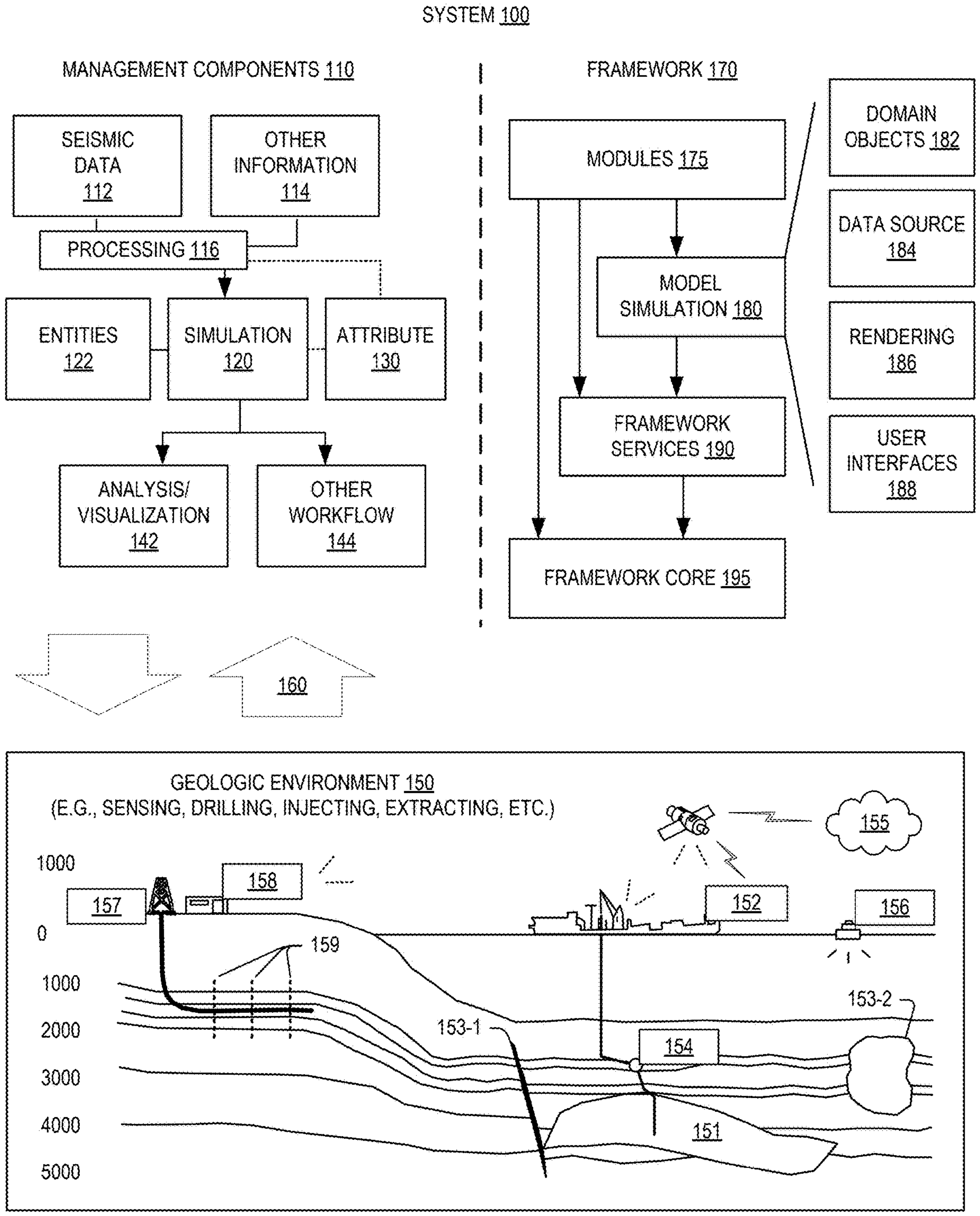
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (SLB, Houston Texas), the INTERSECT™ reservoir simulator (SLB, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (SLB, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (SLB, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Invariant Spectral Markers Providing Steady Reference and Method for Using the Same The present disclosure provides spectral markers which may be read in a variety of different portions of the electromagnetic spectrum, including but not limited to infrared (IR) markers that can be sensed using thermal imagery. Spectral markers may be used in a number of different applications within the energy industry including as an independent reference point (i.e., electrically powered) or as a secondary data sensor, for example as a temperature sensor which reads the temperature emitted from surface equipment or other equipment associated with the geological environment 150 seen in FIG. 1.

Figure 2:
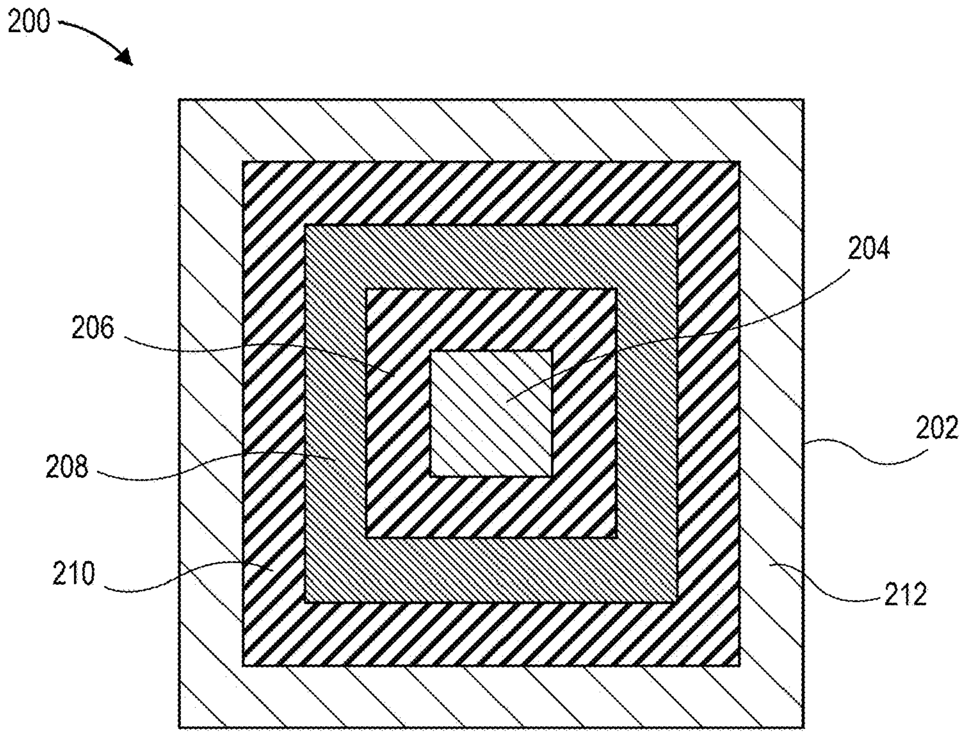
FIG. 2 illustrates a top down view of a spectral marker comprising a substantially square shape, according to an embodiment.
Figure 3:
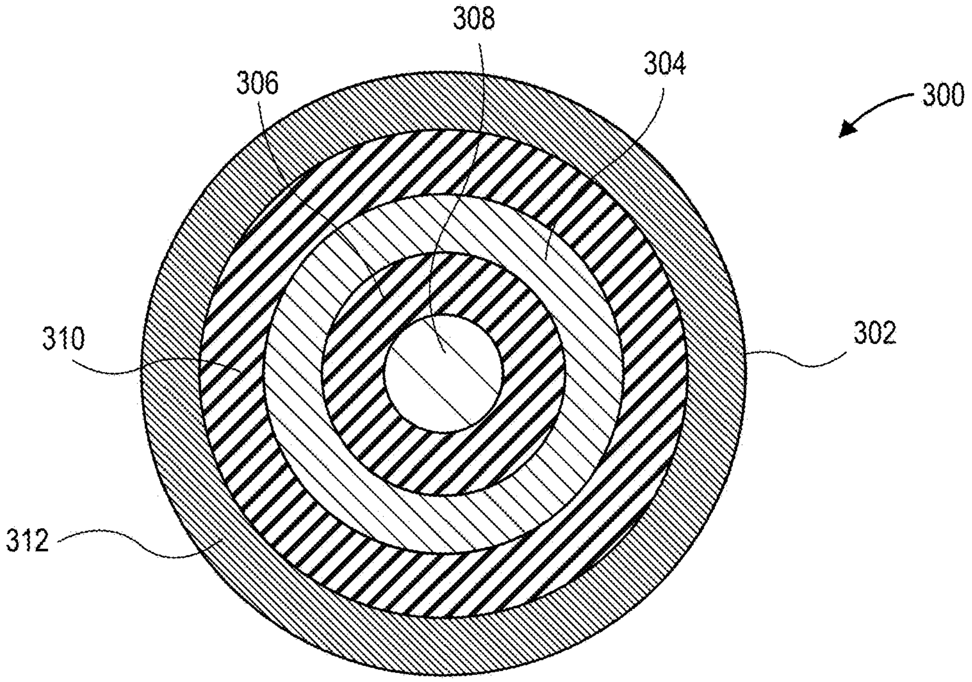
FIG. 3 illustrates a top down view of a spectral marker comprising a substantially circular shape, according to an embodiment.

According to certain embodiments, the spectral marker may have a spectral signature which remains constant, both spatially and temporally, thereby providing a distinguishable marker that is invariant to the parameters of the surrounding production system or surface equipment that limits the applications of RGB and IR imaging for different purposes. The present disclosure provides spectral markers 200, 300 as seen in FIGS. 2 and 3 respectively, that can be sensed or detected using spectral imagery including, according to certain embodiments, thermal imagery. The spectral markers 200, FIGS. 2 and 300, FIG. 3 are used for a variety of purposes including but not limited to as a heat source that is electrically powered by an outside source, or as a temperature sensor that receives an ambient temperature for illumination from another piece of equipment or from the ambient environment.

Turning to FIG. 2, a spectral marker 200 according to certain embodiments is shown which includes a surface 202 that is substantially square shaped. According to certain embodiments, the spectral marker 200 includes a plurality of segmented areas, zones, or portions which are separated from each other so as to provide a clearer contrast between each area, zone, or portion. A first area 204 is disposed substantially in the middle of the square shaped surface 202, the first area 204 itself also comprising a substantially square shape. According to certain embodiments, the first area 204 includes a spectral value, for example, a temperature, wavelength, or frequency, which is equivalent to the surface equipment, production system, or other surface within a facility that the spectral marker 200 is located in or coupled to. Disposed around the first area 204 is a first neutral area 206 that completely surrounds or encompasses the first area 204, and a second area 208 which in turn completely surrounds the first neutral area 206. According to certain embodiments, the second area 208 includes a spectral value that is lower relative to the spectral value of the first area 204, while the first neutral area 206 includes an insulator or other means that helps separate the second area 208 from the first area 204, thereby ensuring that they maintain their respective spectral values. Disposed around the second area 208 is a second neutral area 210 that completely surrounds or encompasses the second area 208, and a third area 212 which in turn completely surrounds the second neutral area 210. The third area 212 extends to an outside edge of the surface 202. According to certain embodiments, the third area 212 includes a spectral value that is higher relative to the spectral value of the first area 204, while the second neutral area includes an insulator or other means that helps separate the third area 212 from the second area 208, thereby ensuring that they maintain their respective spectral values.

In FIG. 3, a spectral marker 300 according to certain embodiments is shown which includes a surface 302 that is substantially circular shaped. According to certain embodiments, the spectral marker 300 includes a plurality of segmented areas, zones, or portions which are separated from each other so as to provide a clearer contrast between each area, zone, or portion. A first area 304 is disposed substantially in a middle of the circular shaped surface 302, the first area 304 itself including a substantially annular shape. According to certain embodiments, the first area 304 includes a spectral value, for example a temperature, wavelength, or frequency, which is equivalent to the surface equipment, production system, or other surface within a facility that the spectral marker 300 is located in or coupled to. Disposed within the first area 304 is a first neutral area 306 that is disposed more radially inward relative to the first area 304, and a second area 308 which in turn is encompassed by the first neutral area 306. According to certain embodiments, the second area 308 includes a spectral value that is higher relative to the spectral value of the first area 304, while the first neutral area 306 includes an insulator or other means that helps separate the second area 308 from the first area 304, thereby ensuring that they maintain their respective spectral values. Disposed around the first area 304 is a second neutral area 310 that completely surrounds or encompasses the first and second areas 304, 308, and a third area 312 which in turn completely surrounds the second neutral area 310. The third area 312 extends to an outside edge of the surface 302. According to certain embodiments, the third area 312 includes a spectral value that is lower relative to the spectral value of the first area 304, while the second neutral area 310 includes an insulator or other means that helps separate the third area 312 from the second area 308, thereby ensuring that they maintain their respective spectral values.

While FIGS. 2 and 3 show a substantially square and circular shaped spectral marker 200, FIGS. 2 and 300, FIG. 3, respectively, this is meant for illustrative purposes. It should be understood that the spectral markers 200, FIGS. 2 and 300, FIG. 3 may include two dimensional or three dimensional shapes and sizes not explicitly shown, for example, rectangles, triangles, cubes, prisms, spheres, and the like. According to certain embodiments, the spectral markers 200, FIGS. 2 and 300, FIG. 3 maintain a unique spectral signature or profile and can be recognized from various viewing directions. Due to the substantially symmetric shape of the spectral markers 200, FIGS. 2 and 300, FIG. 3, each spectral marker 200, FIGS. 2 and 300, FIG. 3 offers an easy-to-identify center or middle portion, for example first area 204, FIG. 2 of spectral marker 200, FIG. 2 or second area 308, FIG. 3 of spectral marker 300, FIG. 3, even when reading the spectral marker 200, FIGS. 2 and 300, FIG. 3 from perspective or angled views.

According to certain embodiments, each of the areas 204-212, FIGS. 2 and 304-312, FIG. 3 of each of the spectral markers 200, FIGS. 2 and 300, FIG. 3 is configured to emit a spectral value including a wavelength that is between 100 nm and 15 mm. Because the areas 204-212, FIGS. 2 and 304-312, FIG. 3 of each of the spectral markers 200, FIGS. 2 and 300, FIG. 3 emit a corresponding spectral value, the areas 204-212, FIGS. 2 and 304-312, FIG. 3 cooperate to form a unique pattern on each spectral marker 200, FIGS. 2 and 300, FIG. 3. According to certain embodiments, each spectral marker 200, FIGS. 2 and 300, FIG. 3 includes a combination of areas 204-212, FIGS. 2 and 304-312, FIG. 3 which form a uniquely distinguishable shape, which could provide either an absolute or a relative reading, with a spatial layout of the neutral areas 206, 210, FIGS. 2 and 306, 310, FIG. 3 specifically disposed on each spectral marker 200, FIGS. 2 and 300, FIG. 3 to provide contrast and thus prevent blurring, contamination, or overflow. Providing adequate contrast between or among the areas 204-212, FIGS. 2 and 304-312, FIG. 3 further smoothens the boundaries between different areas 204-212, FIGS. 2 and 304-312, FIG. 3, improving the detectability or readability of the spectral signature of each spectral marker 200, FIGS. 2 and 300, FIG. 3.

According to certain embodiments, the pattern may be formed by adjacent or adjoining areas 204-212, FIGS. 2 and 304-312, FIG. 3 disposed on the surface 202, FIGS. 2 and 302, FIG. 3 of the spectral markers 200, FIGS. 2 and 300, FIG. 3, the unique pattern thereby forming a spatial spectral signature that is unique for that particular spectral marker 200, FIGS. 2 and 300, FIG. 3. According to certain other embodiments, the spectral values of the areas 204-212, FIGS. 2 and 304-312, FIG. 3, and thus the total spectral signature, may vary over time. For example, the spectral value emitted by at least one of the areas 204-212, FIGS. 2 and 304-312, FIG. 3 may be cyclical, repeating, or otherwise follow a predetermined pattern, thereby forming a temporal spectral signature that is unique for that particular spectral marker 200, FIGS. 2 and 300, FIG. 3. In this manner, the spectral markers 200, FIGS. 2 and 300, FIG. 3 may comprise a varying spectral signature that is keyed to different conditions for easier detection. In a further embodiment, each spectral marker 200, FIGS. 2 and 300, FIG. 3 includes at least one "dead" area or area which emits no spectral value, interspersed with at least one "live" area which emits a spectral value, thereby creating a pattern of presence or absence of a reading in order to generate its corresponding unique spectral signature. According to certain embodiments, the spectral marker 200, FIGS. 2 and 300, FIG. 3 includes a spectral filter disposed over or on top of at least one of the areas 204-212, FIGS. 2 and 304-312, FIG. 3, thereby providing a pattern which simply cuts off a specific portion of the spectral signature, thereby making the spectral signature unique through its "pattern of absence." According to certain embodiments, at least one area 204-212, 304-312 of the spectral marker 200, 300 is reflective, the reflective area configured to reflect a spectral value back to the sender/sensor or reflect ambient energy or light towards a sensor. The reflected spectral signature is uniquely defined due to a polarization or absorption level/reflectivity associated with each of the different areas 204-212, FIGS. 2 and 304-312, FIG. 3.

According to certain embodiments, the frequency of how often the spectral signature of the spectral marker 200, FIGS. 2 and 300, FIG. 3 is cycled can convey different meanings, for example alerts, alarms, warnings, or other conditions could be conveyed based the current spectral signature of the marker 200, FIGS. 2 and 300, FIG. 3. According to certain embodiments, different areas 204-212, FIGS. 2 and 304-312, FIG. 3 on the spectral marker 200, FIGS. 2 and 300, FIG. 3 may be turned on or off for example by varying its corresponding power intensity, toggling its wave amplitude or frequency from one extreme to another, or a variety of combinations thereof to provide a temporal pattern in addition to the spatial one, thereby creating a unique overall spectral signature within a portion of interest within the electromagnetic spectrum.

The spectral markers 200, FIGS. 2 and 300, FIG. 3 according to certain embodiments can adapt to the surrounding environment or production system and adjust the spectral value of one or more of their respective component areas 204-212, FIGS. 2 and 304-312, FIG. 3, so that their respective spectral signatures are constant. For example, spectral markers 200, FIGS. 2 and 300, FIG. 3 adjust or compensate for changes in the amount of light or temperature within the production system so their respective spectral signatures remain consistent. In one particular embodiment, the adaptability of the spectral marker 200, FIGS. 2 and 300, FIG. 3 to the surrounding production system can be achieved, for example, by a thermostat circuit that is disposed within the production system. In another embodiment, the thermostat circuit is disposed or maintained outside the production system. According to certain other embodiments, the spectral markers 200, FIGS. 2 and 300, FIG. 3 do not maintain a constant spectral value but due to the contrasting pattern formed by the corresponding areas 204-212, FIGS. 2 and 304-312, FIG. 3 disposed across the spectral marker 200, FIGS. 2 and 300, FIG. 3.

According to certain embodiments, the spectral markers 200, FIGS. 2 and 300, FIG. 3 also include a QR code tag disposed thereon that appears within the visible spectrum, thereby providing a spectral marker 200, FIGS. 2 and 300, FIG. 3 which is configured to provide a spectral signature in more than one portion of the electromagnetic spectrum. For example, a spectral marker 200, FIGS. 2 and 300, FIG. 3 with a QR code tag or other label can be used in both thermal and visual imaging. Such a spectral marker 200, FIGS. 2 and 300, FIG. 3 could be used for both human consumption (i.e. the spectral signature is within visible light portion of the electromagnetic spectrum) and machine readability (i.e. the spectral signature is within a range of the electromagnetic spectrum not detectable by the human eye).

According to certain embodiments, each of the spectral markers 200, FIGS. 2 and 300, FIG. 3 simultaneously emit a spectral signature and sense or detect a secondary value. For example, in addition to providing invariant spectral values, at least one area 204-212, FIGS. 2 and 304-312, FIG. 3 of the spectral markers 200, FIGS. 2 and 300, FIG. 3 can be used to transmit data related to the surface equipment of the production system, for example the temperature of an object within the production system. When reading by an imaging device, both the spectral signature and the secondary value is obtained, thereby avoiding the need for additional sensors. In one embodiment, at least one area 204-212, FIGS. 2 and 304-312, FIG. 3 is for example configured to change color based on the surface of the production system it is coupled to. In such a manner, the spectral marker 200, FIGS. 2 and 300, FIG. 3 can double as not only a reference marker but also as a thermometer as the color would reflect the actual or real-time temperature of the production system, which could be used for identifying possible alerts from thermal images thereof.

High quality 3D reconstructions are hard to create due to the lack of good distinguishing features that stay constant during a capture session. By placing time-invariant and correspondingly unique spectral markers 200, FIGS. 2 and 300, FIG. 3 in the environment, one can reliably match features across multiple images and, hence, do a better job at aligning the locations of the spectral markers 200, FIGS. 2 and 300, FIG. 3 in a 3D space, for example the surface equipment or production system, thereby resulting in a better overall reconstruction. According to certain embodiments, when reconstructing a 3D thermal mapping or image of a facility or production system where thermal imagery is collected, one can combine thermal images into 3D thermal models, thereby improving analysis in 3D. Events occurring within the production system, for example an event related to temperature changes that could trigger an alarm, are correlated spatially within the 3D reconstruction.

In inspections that are performed by robots, the spectral markers 200, FIGS. 2 and 300, FIG. 3 enable consistent data collection by the robots for different situations. For example, according to one particular embodiment, the spectral markers 200, FIGS. 2 and 300, FIG. 3 act as invariant QR codes that always help the robot position itself relative to a certain object within the production system for consistent collection of data regardless of surrounding environmental conditions. Alternatively, in cases where the temperature change over time within the production system is possible, the spectral markers 200, FIGS. 2 and 300, FIG. 3 include a spectral signature that, when read by the robot, instruct the robot to take a specific action.

According to certain embodiments, the reconstruction may take the form of a 1D, 2D, 3D, or 4D model of real-world equipment, such as the surface equipment or production system the spectral marker 200, FIGS. 2 and 300, FIG. 3 is disposed on, visualized in a particular or predetermined spectrum. The same model may be visualized in two different spectra, or according to certain embodiments, separate models in different spectra may be fused in order to produce a single, combined model. According to some embodiments, the reconstructed model may also provide visualization of the changes over time in the readings within a particular or predetermined spectrum across various surfaces and equipment within the production system.

Figure 4:
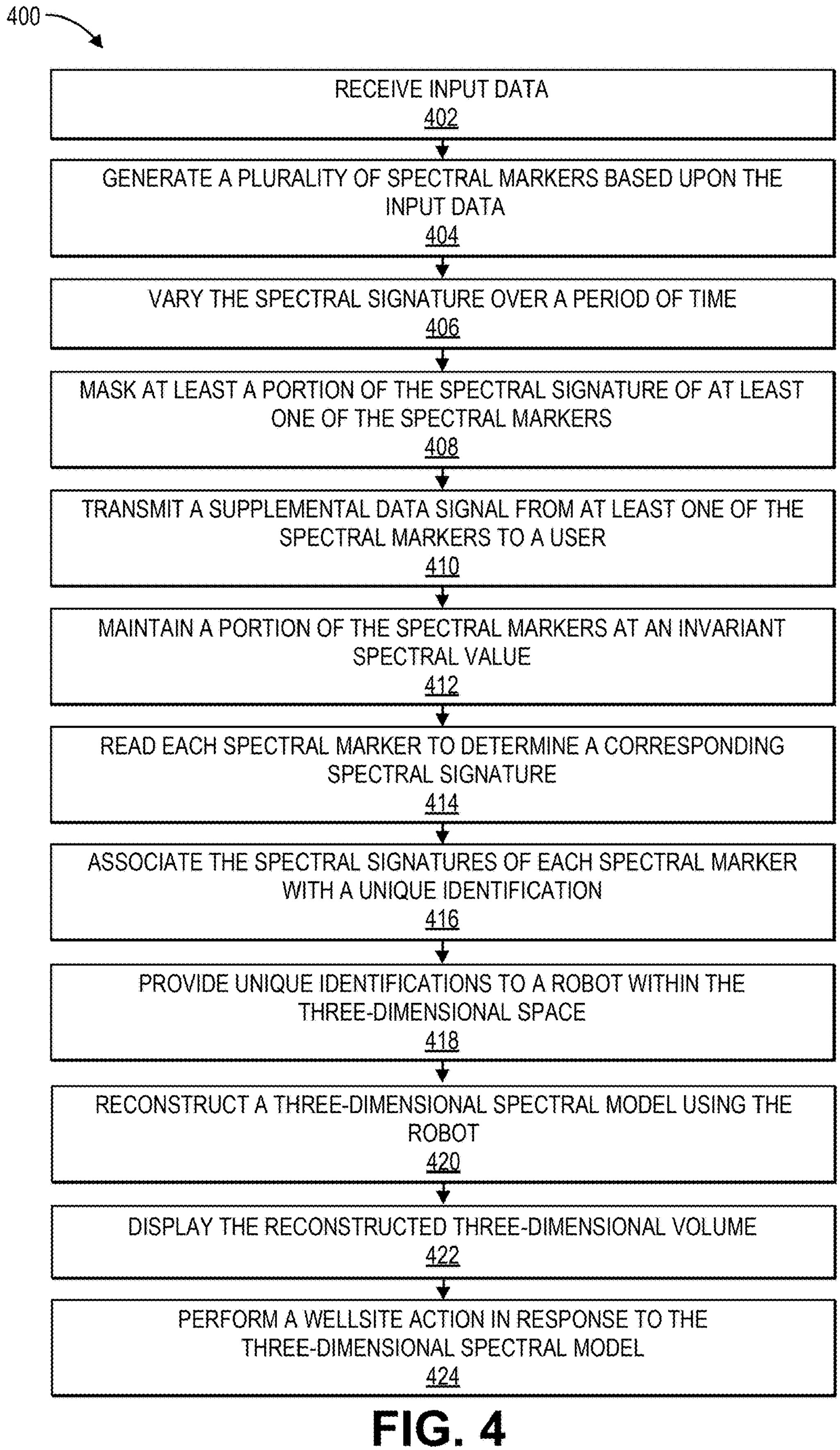
FIG. 4 illustrates a flowchart of a method for producing three-dimensional spectral models of a production system, according to an embodiment.

FIG. 4 illustrates a flowchart of a method 400 for producing three-dimensional spectral models of a production system, according to an embodiment. An illustrative order of the method 400 is described below; however, one or more portions of the method 400 may be performed in a different order, simultaneously, repeated, or omitted. At least a portion of the method 400 may be performed by a computing system (described below).

The method may include receiving input data representing a production system, as at 402. The input data, for example, is received from a plurality of spectral markers 200, FIGS. 2 and 300, FIG. 3 disposed around the production system. Each spectral marker 200, FIGS. 2 and 300, FIG. 3 includes a unique spectral pattern as discussed above.

The method 400 includes generating a plurality of spectral markers based upon the input data, as at 404. According to certain embodiments, the spectral markers 200, FIGS. 2 and 300, FIG. 3 are generated within a three-dimensional space. Each of the spectral markers 200, FIGS. 2 and 300, FIG. 3 includes a unique spectral signature, and according to certain embodiments, the unique spectral signature of each of the spectral markers includes a wavelength between 100 nm and 15 mm. According to certain embodiments, each of the spectral markers 200, FIGS. 2 and 300, FIG. 3 includes either a two-dimensional or three-dimensional shape. The spectral signatures of each of the corresponding spectral markers 200, FIGS. 2 and 300, FIG. 3 includes a pattern of spectral values that is unique to each one of the corresponding spectral markers 200, FIGS. 2 and 300, FIG. 3. In one embodiment, each of the spectral markers 200, FIGS. 2 and 300, FIG. 3 includes at least one portion that is reflective.

According to certain embodiments, the pattern which forms the spectral signature of each of the spectral markers 200, FIGS. 2 and 300, FIG. 3 includes at least one neutral area 206, 210, FIG. 2, 306, 310, FIG. 3, a first area 204, FIG. 2, 304, FIG. 3 having a spectral value equal to the three-dimensional space, a second area 212, FIG. 2, 308, FIG. 3 having a spectral value which is higher relative to the first area 204, FIG. 2, 304, FIG. 3, and a third area 208, FIG. 2, 312, FIG. 3 having a spectral value which is lower relative to first area 204, FIG. 2, 304 FIG. 3. The first, second, and third areas of each of the spectral markers 200, FIGS. 2 and 300, FIG. 3 are arranged in a surface pattern that is unique to each one of the corresponding spectral markers 200, FIGS. 2 and 300, FIG. 3. According to certain embodiments, the second areas 212, FIG. 2, 308, FIG. 3, has a spectral value which is higher relative to a spectral value of the at least one neutral area 206, 210, FIG. 2, 306, 310, FIG. 3, while the third areas 208, FIG. 2, 312, FIG. 3 has a spectral value which is lower relative to the spectral value of the at least one neutral area 206, 210, FIG. 2, 306, 310, FIG. 3. The pattern of spectral values that is unique to each one of the corresponding spectral markers 200, FIGS. 2 and 300, FIG. 3 is configured to provide a contrast between at least two areas of the spectral marker 200, FIGS. 2 and 300, FIG. 3, for example the at least one neutral area 206, 210, FIG. 2, 306, 310, FIG. 3 includes a material that is configured to provide a contrast with the first area 204, FIG. 2, 304 FIG. 3, second areas 212, FIG. 2, 308, FIG. 3, or third areas 208, FIG. 2, 312, FIG. 3.

According to certain embodiments, the method 400 includes varying the spectral signature of at least one of the spectral markers 200, FIGS. 2 and 300, FIG. 3 over a period of time, as at 406. In certain embodiments, varying the spectral signature includes cyclically or non-cyclically varying the spectral signature, ceasing a power flow to at least one area of the spectral marker 200, FIGS. 2 and 300, FIG. 3, varying a power intensity of at least one area of the spectral marker 200, FIGS. 2 and 300, FIG. 3, varying a wave amplitude or a frequency of the spectral marker 200, FIGS. 2 and 300, FIG. 3, or a combination thereof.

According to certain embodiments, the method 400 includes masking at least a portion of the spectral signature of at least one of the spectral markers 200, FIGS. 2 and 300, FIG. 3 with a spectral filter disposed on the spectral marker 200, FIGS. 2 and 300, FIG. 3, as at 408.

According to certain embodiments, the method 400 includes transmitting a supplemental data signal from at least one of the spectral markers 200, FIGS. 2 and 300, FIG. 3 to a user, as at 410. The supplemental data signal according to certain embodiments is comprised of at least one of the following: GPS data, humidity, detection or concentration of a gas, pressure, or fluid level.

According to certain embodiments, the method 400 includes maintaining a portion of the spectral markers 200, FIGS. 2 and 300, FIG. 3 at a respective invariant spectral value, as at 412. In one embodiment, the portion of the spectral marker 200, FIGS. 2 and 300, FIG. 3 includes the second areas 212, FIG. 2, 308, FIG. 3 and third areas 208, FIG. 2, 312 FIG. 3 areas. In an alternative embodiment, the spectral markers 200, FIGS. 2 and 300, FIG. 3 receive power to maintain their respective invariant spectral value from the three-dimensional space or from an outside or independent power source.

According to certain embodiments, the method 400 includes reading each of the spectral markers 200, FIGS. 2 and 300, FIG. 3 within the three-dimensional space to determine the spectral signature corresponding to each one of the spectral markers 200, FIGS. 2 and 300, FIG. 3, as at 414. In certain embodiments, reading the plurality of spectral markers 200, FIGS. 2 and 300, FIG. 3 includes reading the spectral markers 200, FIGS. 2 and 300, FIG. 3 with a spectral device that is configured to read the pattern of spectral values of each spectral signature. In one embodiment, the spectral device is disposed on a robot payload.

According to certain embodiments, the method 400 includes associating the determined spectral signatures of each of the plurality of spectral markers 200, FIGS. 2 and 300, FIG. 3 with a unique identification, as at 416. In one embodiment, the unique identification corresponds to a location within the three-dimensional space.

According to certain embodiments, the method 400 includes providing the unique identifications to a robot within the three-dimensional space, as at 418. In one embodiment, the robot aligns itself within the three-dimensional space according to the associated locations.

According to certain embodiments, the method 400 includes reconstructing a three-dimensional spectral model using the robot, as at 420. In one embodiment, the three-dimensional spectral model includes a three-dimensional volume including the assigned locations.

According to certain embodiments, the method 400 includes displaying the reconstructed three-dimensional volume, as at 422. In one embodiment, displaying the three-dimensional volume includes displaying the reconstructed three-dimensional volume on a screen. According to certain embodiments, displaying the three-dimensional volume includes detecting an anomaly within the three-dimensional volume by the user.

According to certain embodiments, the method 400 includes performing a wellsite action in response to the three-dimensional spectral model, as at 424. In certain embodiments, performing the wellsite action includes generating or transmitting a signal that instructs or causes an action to occur, the action being a physical action. In certain embodiments, the physical action including selecting where to drill a wellbore in the subsurface formation, drilling the wellbore, varying a trajectory of the wellbore, varying a weight or torque on a drill bit that is drilling the wellbore, varying a rate or concentration of a fluid being pumped into the wellbore, or a combination thereof, according to an embodiment.

Exemplary Computing System

Figure 5:
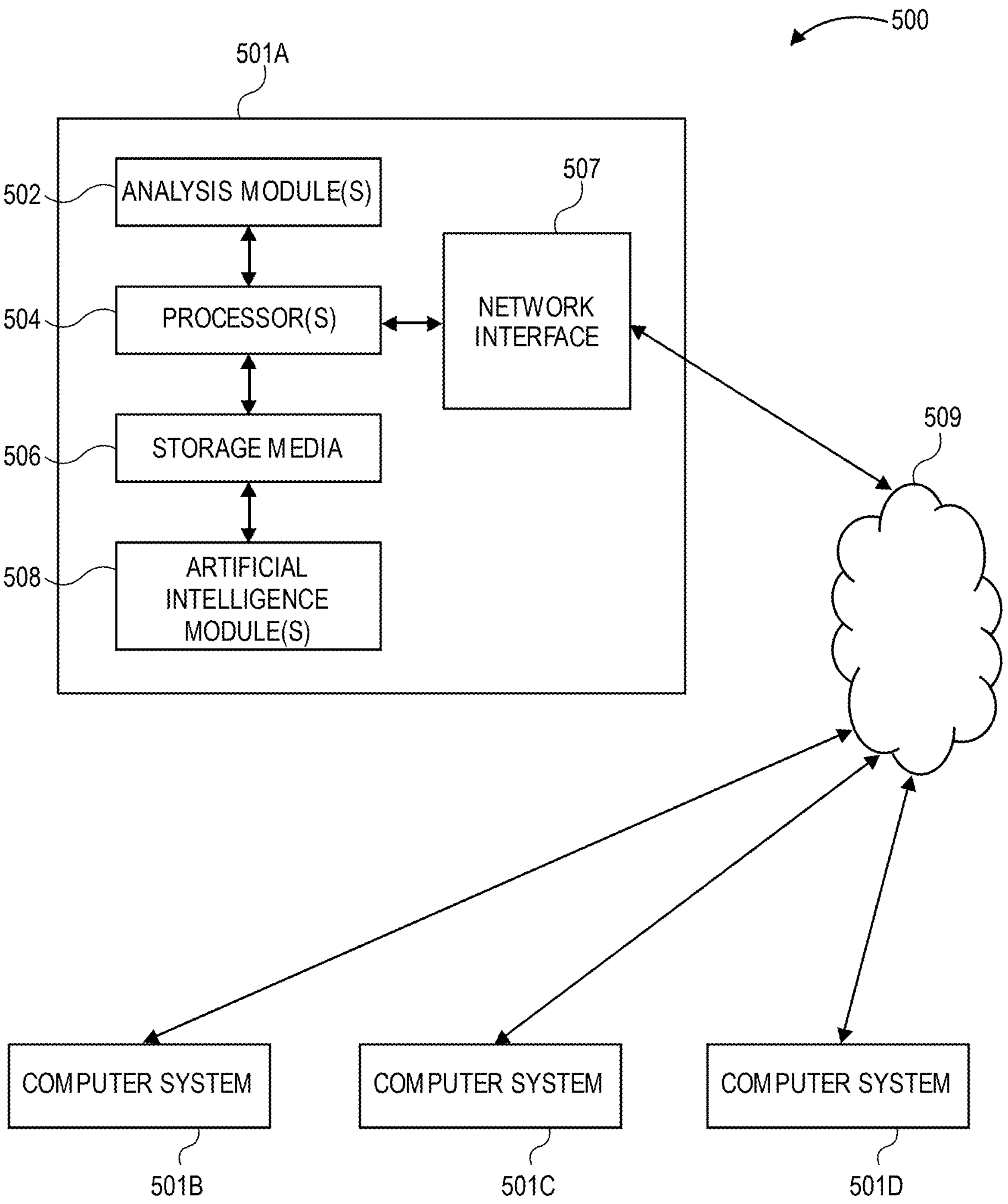
FIG. 5 illustrates a schematic view of a computing system for performing at least a portion of the method(s) described herein, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more method execution module(s) 508. In the example of computing system 500, the computer system 501A includes the method execution module 508. In some embodiments, a single method execution module may be used to perform some aspects of one or more embodiments of the methods disclosed herein. In other embodiments, a plurality of method execution modules may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for producing three-dimensional spectral models of a production system, the method comprising:

receiving input data from a plurality of spectral markers disposed in the production system;

generating the plurality of spectral markers within a three-dimensional space based upon the input data;

reading each of the spectral markers within the three-dimensional space to determine a unique spectral signature corresponding to and emitted from each of the spectral markers, wherein reading each of the spectral markers within the three-dimensional space to determine the unique spectral signature corresponding to each of the spectral markers comprises:

reading a pattern of spectral values that is unique to each of the spectral markers, wherein reading the pattern of spectral values that is unique to each of the spectral markers comprises:

reading at least one neutral area;

reading a first area comprising a first spectral value equal to a spectral value corresponding to the three-dimensional space;

reading a second area comprising a second spectral value which is higher relative to the first spectral value of the first area;

reading a third area comprising a third spectral value which is lower relative to the first spectral value of the first area, wherein the first, second, and third areas of each of the spectral markers are arranged in a surface pattern that is unique to each of the spectral markers, wherein the third area completely surrounds the first area and the second area completely surrounds the third area or wherein the first area completely surrounds the second area and the third area completely surrounds the first area, and wherein the first area, the second area, and the third area are disposed in a common plane to form a two-dimensional shape; and providing a contrast between at least two of the areas forming the pattern of spectral values that is unique to each of the spectral markers; or reflecting an ambient signal off of the spectral markers to read the pattern of spectral values that is unique to each of the spectral markers;

associating each unique spectral signature of each of the spectral markers with a unique identification to generate a plurality of unique identifications, wherein each unique identification corresponds to a location within the three-dimensional space;

providing the plurality of unique identifications to a robot within the three-dimensional space, wherein the robot positions itself during an inspection of the production system by the robot within the three-dimensional space according to the locations within the three-dimensional space corresponding to the plurality of unique identifications; and reconstructing a three-dimensional spectral model including the locations.

2. The method of claim 1, further comprising displaying the three-dimensional spectral model.

3. The method of claim 1, further comprising performing an action in response to the three-dimensional spectral model.

4. The method of claim 1, further comprising varying the unique spectral signature of at least one of the spectral markers over a period of time, wherein varying the unique spectral signature comprises:

cyclically or non-cyclically varying the unique spectral signature that is emitted;

ceasing a power flow to at least one area of the at least one of the spectral markers;

varying a power intensity of the at least one area of the at least one of the spectral markers;

varying a wave amplitude or a frequency of the at least one of the spectral markers; or a combination thereof.

5. The method of claim 1, further comprising transmitting a supplemental data signal from at least one of the spectral markers, wherein the supplemental data signal is comprised of at least one signal received from the production system.

6. The method of claim 1, further comprising masking the at least one neutral area, the first area, the second area, or the third area with a spectral mask.

7. The method of claim 1, further comprising maintaining at least a portion of each of the spectral markers at an invariant spectral value, wherein maintaining the at least a portion of each of the spectral markers at an invariant spectral value comprises powering the at least a portion of each of the spectral markers from a power source within the three-dimensional space or from an outside or independent power source.

8. The method of claim 1, wherein reading each of the spectral markers within the three-dimensional space to determine the unique spectral signature corresponding to each of the spectral markers comprises reading the spectral markers with a spectral device configured to read a pattern of spectral values that is unique to each of the spectral markers, wherein the spectral device is disposed on the robot.

9. A computing system, comprising:

one or more processors;

a plurality of spectral markers communicated to the one or more processors, wherein the plurality of spectral markers are disposed in a production system;

a robot communicated to the one or more processors, wherein the robot is configured to read the plurality of spectral markers;

at least one sensor communicated to the one or more processors; and a memory system comprising one or more non-transitory computer-readable media storing instructions that, when executed by at least one of the one or more processors, cause the computing system to perform operations, the operations comprising:

receiving input data from the plurality of spectral markers, the input data representing the production system;

generating the plurality of spectral markers within a three-dimensional space based upon the input data;

maintaining at least a portion of each of the spectral markers at an invariant spectral value, wherein the spectral markers receive power to maintain the at least a portion at the invariant spectral value from within the three-dimensional space or from an outside or independent power source;

reading each of the spectral markers within the three-dimensional space to determine a unique spectral signature corresponding to and emitted from each of the spectral markers, wherein the unique spectral signature of each of the spectral markers comprises a wavelength between 100 nm and 15 mm, wherein each of the spectral markers comprises a two-dimensional shape, wherein each of the spectral markers comprises at least one portion that is reflective, wherein reading the plurality of spectral markers comprises reading the spectral markers with a spectral device configured to read a pattern of spectral values that is unique to each of the spectral markers, wherein the spectral device is disposed on the robot, and wherein the pattern of spectral values corresponding to each of the spectral markers comprises:

at least one neutral area;

a first area comprising a first spectral value equal to a spectral value corresponding to the three-dimensional space;

a second area comprising a second spectral value which is higher relative to the first spectral value of the first area; and a third area comprising a third spectral value which is lower relative to the first spectral value of the first area, wherein the first, second, and third areas of each of the spectral markers are arranged in a surface pattern that is unique to each of the spectral markers, wherein the second area comprises the second spectral value which is higher relative to a fourth spectral value of the at least one neutral area, wherein the third area comprises the third spectral value which is lower relative to the fourth spectral value of the at least one neutral area, wherein the pattern of spectral values that is unique to each of the spectral markers is configured to provide a contrast between at least two areas of each of the spectral markers, wherein the at least one neutral area is comprised of a material configured to provide a contrast with the first, second, or third area, wherein the third area completely surrounds the first area and the second area completely surrounds the third area or wherein the first area completely surrounds the second area and the third area completely surrounds the first area, and wherein the first area, the second area, and the third area are disposed in a common plane to form the two-dimensional shape;

associating each unique spectral signature of each of the spectral markers with a unique identification to generate a plurality of unique identifications, wherein each unique identification corresponds to a location within the three-dimensional space;

providing the plurality of unique identifications to the robot within the three-dimensional space, wherein the robot positions itself during an inspection of the production system by the robot within the three-dimensional space according to the locations within the three-dimensional space corresponding to the plurality of unique identifications;

reconstructing a three-dimensional spectral model using the robot or the at least one sensor, wherein the three-dimensional spectral model comprises a three-dimensional volume including the locations within the three-dimensional space corresponding to the plurality of unique identifications; and displaying the three-dimensional volume.

10. The computing system of claim 9, wherein the operations performed by the computing system further comprises varying the unique spectral signature of at least one of the spectral markers over a period of time, wherein varying the unique spectral signature comprises:

cyclically or non-cyclically varying the spectral signature that is emitted;

ceasing a power flow to at least one area of the at least one of the spectral markers;

varying a power intensity of at least one area of the at least one of the spectral markers;

varying a wave amplitude or a frequency of the at least one of the spectral markers; or a combination thereof.

11. The computing system of claim 9, wherein the operations performed by the computing system further comprises transmitting a supplemental data signal from at least one of the spectral markers to the one or more processors, wherein the supplemental data signal is comprised of at least one of the following: GPS data, humidity, detection or concentration of a gas, pressure, fluid level, or a combination thereof.

12. A non-transitory computer-readable medium storing instructions that, when executed by one or more processors of a computing system, cause the computing system to perform operations, the operations comprising:

receiving input data representing a production system;

generating a plurality of spectral markers based upon the input data, wherein the spectral markers are generated within a three-dimensional space, wherein each of the spectral markers comprises a unique spectral signature emitted from each of the spectral markers, wherein the unique spectral signature of each of the spectral markers comprises a wavelength between 100 nm and 15 mm, wherein each of the spectral markers comprises a two-dimensional shape, wherein each of the spectral markers comprises a pattern of spectral values that is unique to each of the spectral markers, wherein each of the spectral markers comprises at least one portion that is reflective, wherein each of the spectral markers comprises:

at least one neutral area;

a first area comprising a first spectral value equal to a spectral value corresponding to the three-dimensional space;

a second area comprising a second spectral value which is higher relative to the first spectral value of the first area; and a third area comprising a third spectral value which is lower relative to the first spectral value of the first area, wherein the first, second, and third areas of each of the spectral markers are arranged in a surface pattern that is unique to each of the spectral markers, wherein the second area comprises the second spectral value which is higher relative to a fourth spectral value of the at least one neutral area, and wherein the third area comprises the third spectral value which is lower relative to the fourth spectral value of the at least one neutral area, wherein the pattern of spectral values that is unique to each of the spectral markers is configured to provide a contrast between at least two areas of each spectral marker, wherein the at least one neutral area is comprised of a material configured to provide a contrast with the first, second, or third area, wherein the third area completely surrounds the first area and the second area completely surrounds the third area or wherein the first area completely surrounds the second area and the third area completely surrounds the first area, wherein the first area, the second area, and the third area are disposed in a common plane to form the two-dimensional shape;

varying the unique spectral signature of at least one of the spectral markers over a period of time, wherein varying the unique spectral signature comprises:

cyclically or non-cyclically varying the unique spectral signature that is emitted;

ceasing a power flow to at least one area of the at least one of the spectral markers;

varying a power intensity of at least one area of the at least one of the spectral markers; or varying a wave amplitude or a frequency of the at least one of the spectral markers;

masking at least a portion of the unique spectral signature of at least one of the spectral markers with a spectral filter disposed on the at least one of the spectral markers;

transmitting a supplemental data signal from at least one of the spectral markers to a user, wherein the supplemental data signal is comprised of at least one of the following: GPS data, humidity, detection or concentration of a gas, pressure, or fluid level;

maintaining a portion of the spectral markers at a respective invariant spectral value, wherein the portion comprises the second and third areas, wherein the spectral markers receive power to maintain the respective invariant spectral value from the three-dimensional space or from an outside or independent power source;

reading each of the spectral markers within the three-dimensional space to determine the unique spectral signature corresponding to each of the spectral markers, wherein reading the plurality of spectral markers comprises reading the spectral markers with a spectral device configured to read the pattern of spectral values that is unique to each of the spectral markers, and wherein the spectral device is disposed on a robot payload;

associating each unique spectral signature of each of the spectral markers with a unique identification to generate a plurality of unique identifications, wherein each unique identification corresponds to a location within the three-dimensional space;

providing the plurality of unique identifications to the robot within the three-dimensional space, wherein the robot positions itself during an inspection of the production system by the robot within the three-dimensional space according to the locations within the three-dimensional space corresponding to the plurality of unique identifications;

reconstructing a three-dimensional spectral model using the robot, wherein the three-dimensional spectral model comprises a three-dimensional volume including the locations within the three-dimensional space corresponding to the plurality of unique identifications;

displaying the three-dimensional volume, wherein displaying the three-dimensional volume comprises displaying the three-dimensional volume on a screen, and wherein displaying the three-dimensional volume comprises detecting an anomaly within the three-dimensional volume by the user; and performing a wellsite action in response to the three-dimensional spectral model, wherein performing the wellsite action comprises generating or transmitting a signal that instructs or causes an action to occur, wherein the action comprises a physical action, and wherein the physical action comprises selecting where to drill a wellbore in a subsurface formation, drilling the wellbore, varying a trajectory of the wellbore, varying a weight or torque on a drill bit that is drilling the wellbore, varying a rate or concentration of a fluid being pumped into the wellbore, or a combination thereof.

13. The non-transitory computer-readable medium of claim 12, wherein displaying the three-dimensional volume comprises displaying a first reconstructed three-dimensional volume corresponding to a first spectral range combined with a second reconstructed three-dimensional volume corresponding to a second spectral range, wherein the first and second reconstructed three-dimensional volumes are displayed on top of one another.

14. The non-transitory computer-readable medium of claim 12, wherein displaying the three-dimensional volume comprises displaying a first reconstructed three-dimensional volume corresponding to a first time period combined with a second reconstructed three-dimensional volume corresponding to a second time period, wherein the first and second reconstructed three-dimensional volumes are displayed on top of one another.

15. The non-transitory computer-readable medium of claim 12, wherein displaying the three-dimensional volume comprises displaying the three-dimensional volume in one, two, three, or four dimensions.

16. The non-transitory computer-readable medium of claim 12, wherein the first area comprises a temperature equal to the three-dimensional space, wherein the second area comprises a temperature that is higher relative to the first area, and wherein the third area comprises a temperature that is lower relative to the first area.

* * * * *